United States Patent [19]

Petersen et al.

[11] 4,158,744
[45] Jun. 19, 1979

[54] ELECTRICAL RESISTANCE FURNACE FOR THE PRODUCTION OF SILICON CARBIDE

[75] Inventors: Fritz Petersen, Neuesting; Andreas Korsten, Balkhausen, both of Fed. Rep. of Germany

[73] Assignee: Elektroschmelzwerk Kempten GmbH, Munich, Fed. Rep. of Germany

[21] Appl. No.: 805,655

[22] Filed: Jun. 13, 1977

[30] Foreign Application Priority Data

Jul. 5, 1976 [DE] Fed. Rep. of Germany ....... 2630198

[51] Int. Cl.$^2$ ............................................... H05B 3/00
[52] U.S. Cl. ...................................................... 13/25
[58] Field of Search ................ 13/20, 23, 25; 423/345

[56] References Cited

U.S. PATENT DOCUMENTS

| | | | |
|---|---|---|---|
| 941,339 | 11/1909 | Tone | 13/25 X |
| 1,044,295 | 11/1912 | Tone | 13/25 X |
| 3,329,527 | 7/1967 | Harris | 13/25 X |
| 3,351,742 | 11/1967 | Harris | 13/25 X |
| 3,607,475 | 9/1971 | Schrewelius | 13/25 X |
| 3,964,943 | 6/1976 | Andersen | 13/25 X |
| 3,989,883 | 11/1976 | Wiebke et al. | 13/23 |

Primary Examiner—R. N. Envall, Jr.
Attorney, Agent, or Firm—Burgess, Ryan and Wayne

[57] ABSTRACT

An electric resistance furnace for the production of silicon carbide from silicon dioxide and carbon has a U-shaped carbonaceous resistance core embedded in the burden of coke, quartz and other additives. The electrodes are disposed adjacent to each other and are connected to the resistance core at the ends of the legs of the U. The ratio of the length of the resistance core to the electrode spacing is at least 1.6.

13 Claims, 1 Drawing Figure

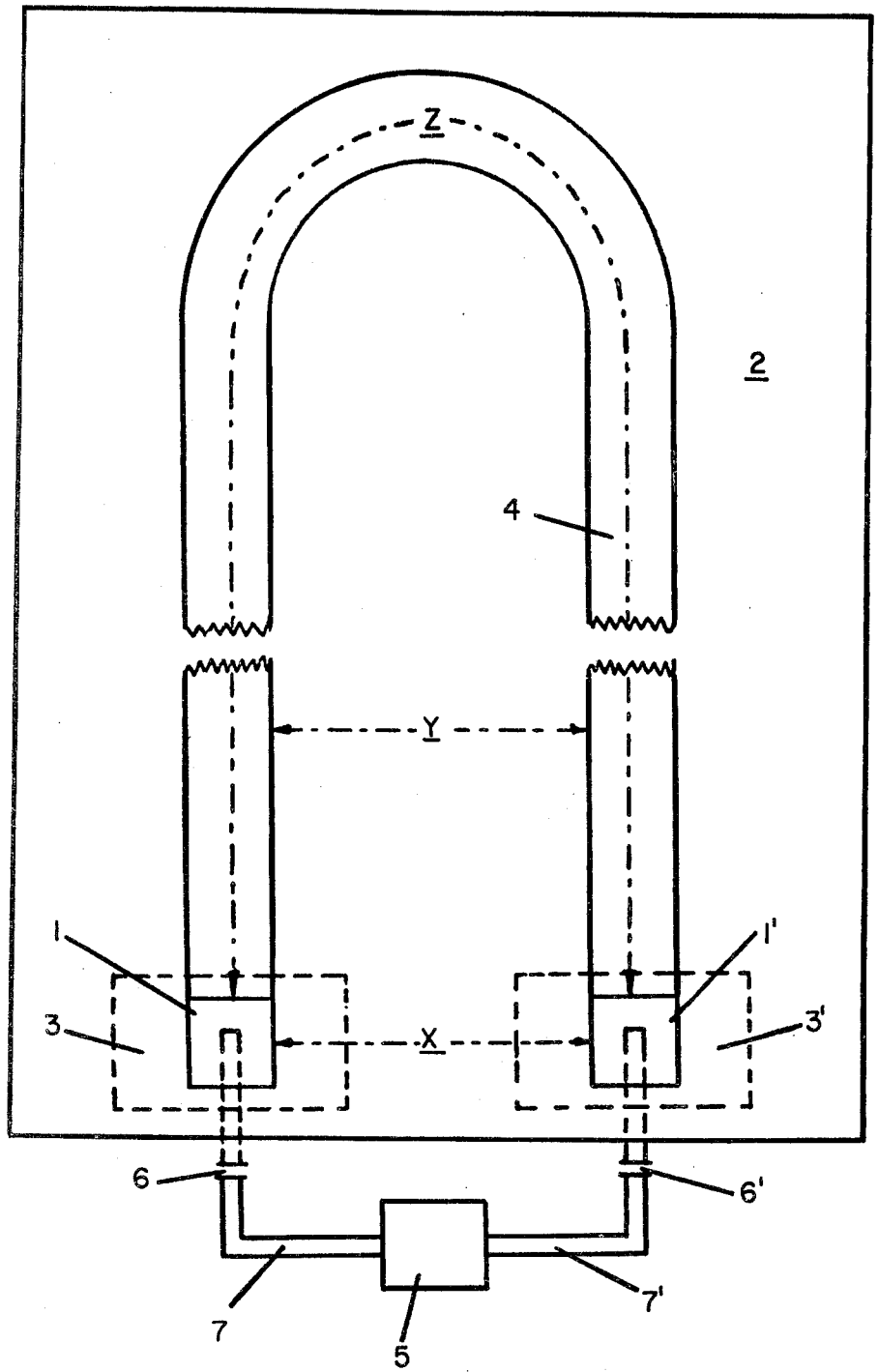

ELECTRICAL RESISTANCE FURNACE FOR THE PRODUCTION OF SILICON CARBIDE

BACKGROUND OF THE INVENTION

This invention relates to the production of silicon carbide, and more particularly this invention relates to an electric resistance furnace for the production of silicon carbide.

Industrial silicon carbide is produced by a discontinuous process in an electric resistance furnace, which process was originally devised by Acheson. In those resistance furnace installations operated by direct electric resistance heating and that can be used exclusively for pure solids reactions, the current is supplied by electrodes through a resistance core of carbon-containing material that is horizontally embedded in the burden consisting of a mixture of granulated coke, quartz sand and additive materials. The electric current effects in the horizontal material column a pure resistance heating, the reaction of materials taking place in the solid phase, that is, in making silicon carbides, a diffusion reaction develops within the temperature range of from about 1500° to 2500° C., preferably from about 1700° C. to 2500° C.

Resistance furnaces of known construction are in general reactangular open at the top and up to 20m long. The bottom and the solid front walls are bricked up with refractory bricks while the side walls are removable. The current is supplied by electrodes embedded in the front walls (see Ullman's Encyclopedia of Industrial Chemistry, Volume 3, 4th edition 1973, pages 534 and following Chapter: Resistance Furnaces).

According to a more recent embodiment of those resistance furnaces as shown in U.S. Pat. No. 3,950,602, the electrodes can also be disposed as bottom electrodes connected to the resistance core by an electrically conductive material, said connection not being built as a component of the resistance core and having higher electric conductivity than the latter. The current is supplied by connection to electric circuits beneath the floor. The burden needed for the reaction can be charged via the bottom electrodes and the resistance core in conformity with its natural alluvial cone and the installation can be operated as a mound furnace without walls, that is, without lateral and front boundaries of wall elements. But the frame installation as a whole can be also surrounded in a conventional manner with walls that receive the burden, but here it is possible to use simple, transportable walls both for the lateral boundary and for the front closure. The open ballast is of course not profitable in a shed due to the large amount of space needed, wherefore those furnaces are at best operated as stationary outdoor installations. As bottom electrodes one can use graphite and/or carbon electrodes equipped with current and cold water lines, said electrodes being usually employed in furnace installations with the so-called front electrode arrangement. Coke and/or graphite equipped with current and cold water lines can also be used for these stamped electrodes, as well as metal electrodes, for as a result of the increased spatial distance between the electrodes and the heating zone proper, the temperatures that appear in the electrodes are considerably lower than in the known furnace installations with electrodes embedded in the front end.

In another embodiment according to U.S. Pat. No. 3,989,883, those installations can also be operated with a combined arrangement of the electrodes, for example, a front electrode and an electrode arranged as a bottom electrode.

However, in all installations of the known constructions, the resistance core embedded in the burden is horizontally disposed in the longitudinal direction, thatis, that is, the form of a single horizontal material column between the electrodes, the spacing between the two electrodes being determined by the given length of the resistance core. Accordingly, the silicon carbide roll formed after termination of the heating phase appears in the form of an elongated cylinder.

It is true that a few tests have been disclosed that differ from the arrangement of the resistance core in the form of a single elongated horizontal material column. Thus, for example, in German Pat. No. 160,101 two parallel, adjacent, elongated power cores are used between two front electrodes. But this arrangement serves not for the production of silicon carbide but for so-called silicon oxycarbides formed by an undersupply of carbon and at a temperature insufficient for the formation of silicon carbide.

In accordance with U.S. Pat. Nos. 941,339 and 1,044,295 there is recommended that the resistance core be disposed in zigzag fashion between the front electrodes, whereby the losses of heat are to be reduced by radiation, and according to German Pat. No. 409,356, an annular heating core is used in association with a spheroidal configuration of the furnace body, electrodes being introduced in the periphery of the sphere. The end product is to assume here the configuration of a cake from the mold of a flat spheroid. But none of these ideas has ever achieved industrial significance.

In all furnace installations of the known construction, the current path is given from the transformer via the first electrode through the resistance core via the second electrode and from the latter through a so-called secondary circuit back to the transformer, it being necessary to locate the secondary circuit as close as possible to the furnace area to achieve a favorable power factor that depends on the size of the surface enclosed by the current path. The secondary circuit is usually laid beneath the furnace bottom, that is, under the floor, so that it cannot be damaged or destroyed by mechanical apparatus during the charging and dismounting of the furnace or by the corrosive action of the hot reaction gases and by so-called "blowers" during the heating phase. For an effective protection against the high temperatures that the furnace bottom can reach during the heating phase, expensive cooling means are needed for the secondary circuit, and in addition the circuit laid under the floor is accessible only with great difficulty when this is required by an interruption in the operation of the furnace. Besides, in case of a thermal destruction of the cool water jacket during the heating phase, there is the danger that the cool water can penetrate the furnace area causing possible explosive reactions.

SUMMARY OF THE INVENTION

The present invention is based on the problem of making available a furnace installation, especially for the production of silicon carbide from silicon doxide and carbon in intermittent operation, and actuated by direct electric heating according to the resistance principle, wherein the current is supplied by means of electrodes through a resistance core of carbon-containing material, said core being horizontally embedded in the burden consisting of a mixture of granulated coke, quartz sand and additive materials, which installation makes unnecessary the use of a secondary circuit below the furnace bottom, or arrangements thereof laterally or above the furnace for re-cycling the current to the transformer, without thereby lowering the power factor and in addition permitting considerable savings in cost in the construction of the furnace installation. According to the invention this problem is solved by disposing the electrodes adjacent to each other, the ratio of the length of the resistance core to the electrode spacing amounting at least to 1.6

By this numeric value established as the quotient of the core length to the electrode spacing, the largest possible distance between the electrodes is determined and the usual arrangement in which the core extends in a longitudinal direction between the electrode and the electrode spacing are thus determined by the total length of the core thereby resulting in a quotient of the core length to electrode spacing of 1.0 which is not adequate for the present invention.

For the resistance core embedded horizontally in the burden as a material column, there results a shape that differs from the longitudinal direction, the configuration of the resistance core being in a U-shape with the leg ends constituting the connection between the electrodes having proved to be especially convenient. The minimum spacing required for the electrodes arranged adjacent each other depends on the inner spacing of the legs of the U-shaped resistance core. Said inner spacing must be dimensioned here at least so as to exclude with certainty a contact or coalescence of the silicon carbide roll formed likewise U-shaped on the inner sides of their legs in order to avoid a direct flow of current through the contact and coalescence points which would short circuit part of the resistance core. From the parameters responsible for the desired size of the silicon carbide roller formed, which are the drawn-in amount of current, and the total length and cross section of the resistance core, it is possible at each time empirically to determine the minimum spacing of the inner sides of the legs of the U-shaped resistance core required in each case.

In the arrangement according to the invention, exclusively the resistance core proper is thus at the disposal of the current path in the furnace area, whereby the setting up of a secondary circuit in the furnace area and the disadvantages associated therewith are eliminated. The U-shaped configuration of the resistance core has in addition the advnatage that thereby the surface enclosed by the current path can be kept as small as possible, which is of decisive importance for a favorable power factor. Besides, the length of the whole furnace installation that is required for a resistance core of equal dimensions disposed in a longitudinal direction can be shortened by one-half, wherefore expenses are saved in the construction of the furnace installation.

In the furnace installation according to the invention, it is possible to use as adjacent electrodes both the front electrodes of known construction and the bottom electrodes according to U.S. Pat. No. 3,950,602, or a combination of front and bottom electrodes according to U.S. Pat. No. 3,989,883. It is of advantage to apply between the two adjacent electrodes an insulating layer to rule out the danger of direct current leakage, especially during the starting phase in which the work is carried out with the highest voltage. As an insulating layer one can use, for example, a fine gravel fill or plates made of asbestos or wood.

The U-shaped resistance core is embedded in the burden needed for the reaction so as to be surrounded by the burden on all sides, that is, including the inner sides of the legs.

The furnace installation can be conventionally surrounded with walls that receive the burden, or it can be like a mound furnace without walls in which the burden is charged in correspondence with its natural alluvial cone, that is, without side boundaries and if desired without a front boundary.

DESCRIPTION OF THE PREFERRED EMBODIMENT

The arrangement shown on the sole FIGURE that makes use of two front or bottom electrodes has proved to be especially advantageous for the furnace installation of the invention. The figure shows the installation diagrammatically as seen from the top.

Two electrically conductive pillars 1, 1' are situated each on top of a respective bottom electrode (not shown) located in the furnace floor 2, which is at the level of the surrounding land (not shown). The two electrodes are accommodated in respective concrete underground chambers 3, 3' as described in greater detail in U.S. Pat. No. 3,950,602 (see especially FIGS. 1a to 3b). A U-shaped resistance core 4 is arranged with the end of each arm abutting a side of a respective conductive pillar 1, 1'. The resistance core 4 is supported above the level of the furnace floor 2, and is surrounded by, a furnace charge (not shown) in the form of a mound having its natural 'conical' shape and not confined by any side or end walls. (cf. FIG. 2b in U.S. Pat. No. 3,950,602). The electrodes are connected to a transformer 5 via electrical connections 6, 6' arranged outside the area of the furnace floor 2 and via current leads 7, 7'.

In the following examples have been used furnace installations according to the diagram shown in the figure with the indicated dimensions for the production of silicon carbide. In each example, the distance x between the two bottom electrodes (as measured between the two opposed edges of the respective upper surfaces of the electrodes) and the distance y between the two arms of the U-shaped resistance core 4 were identical.

EXAMPLE 1

Spacing between two adjacent bottom

| | |
|---|---|
| electrodes (x = y) | 80 cm |
| Total length of the resistance core (z) | 5 m |
| Quotient of the core length and electrode spacing (z/x) | 6.25 |
| Cross section of the resistance core | 40 × 12 cm |
| Total current consumption | 12,500 kWh |

The silicon carbide rolls obtained had a perfect U-shape without coalescence in the inner sides of their legs.

EXAMPLE 2

Spacing between two adjacent bottom electrodes

| | |
|---|---|
| (x = y) | 2.5 m |
| Total length of the resistance core (z) | 12.0 m |
| Quotient of the core length and electrode spacing (z/x) | 4.8 |
| Cross section of the resistance core | 100 × 20 cm |
| Total current consumption | 244,150 kWh |

The silicon carbide rolls obtained had a perfect U-shape without coalescence in the inner sides of their legs.

It must be regarded as surprising that by means of the adjacent electrodes according to the invention combined with the resistance core advantageously built in a part-annular to U-shape, it is possible to force the power supply sought from the first to the second electrode exclusively via the resistance core proper. The arrangement according to the invention does not only clearly abandon the principle of the predetermined shortest current path that hitherto had been generally regarded as necessary; in addition, it would have been required to take into account that by keeping the required minimum distances, with the progressing heating phase, the current would take a shortened path between the legs of the resistance core by the resistance of the burden that decreases at the high temperatures. But unexpectedly the current leakage through the burden between the legs of the U-shaped resistance core is extraordinarily low, and thus even with a relatively high total charging rate, no losses of the power factor of the furnace installation are to be registered.

The furnace installation according to the invention has a number of advantages over a conventional furnace installation of the above type with a straight resistance core. In particular, the problems associated with laying the secondary line as close as possible to the furnace area and, especially, the problems associated with laying it under the furnace floor are eliminated. With the shape of the resistance core used according to the invention, it is possible to keep the area bounded by the current path to a minimum and thus to obtain a particularly good power factor. Moreover, a furnace installation according to the invention may be much more compact, for the same length of resistance core, than a conventional furnace installation of the above type with a straight resistance core, with the result that is construction is much less expensive.

What is claimed is:

1. In a furnace installation, for the production of silicon carbide from silicon dioxide and carbon in intermittent operation, actuated by direct electric heating according to the resistance principle, wherein the current is supplied by means of electrodes through a resistance core of carbon-containing material, said core being horizontally embedded in the burden consisting of a mixture of granulated coke, quartz sand and additive materials, the improvement which comprises: said resistance core being in a semicircular to U-shape and said electrodes being spaced so that the ratio of the length of the resistance core to the distance between said electrodes is at least 1.6

2. A furnace installation according to claim 1, characterized in that the resistance core is built in a U-shape with the ends of the legs constituting the connection to the electrodes.

3. A furnace installation as claimed in claim 1, which includes a wall of an electrically insulating material situated between the two electrodes.

4. A furnace installation as claimed in claim 3, wherein the electrically insulating material is gravel, asbestos or wood.

5. A furnace installation as claimed in claim 1, wherein the electrodes are arranged in the floor of the furnace, and wherein a substantially vertical electrically conductive pillar is situated on top of each electrode with the core so arranged that each end abuts a side of a respective conductive pillar, the electrical conductivity of each conductive pillar being higher than that of the core.

6. The furnace installation as claimed in claim 1 having up to two end walls, wherein each electrode is mounted in an end wall, and wherein the furnace charge is in the form of a free-standing mound covering the resistance core.

7. A furnace installation as claimed in claim 6, arranged as a stationary installation in the open air.

8. A furnace installation as claimed in claim 1, wherein the resistance core is of a carbonaceous material and the furnace charge comprises a carbonaceous material and quartz sand.

9. A furnace installation as claimed in claim 8, wherein the resistance core is of granular coke with an inner core of graphitized coke and the furnace charge comprises graphite coke and quartz sand.

10. In a process for the manufacture of silicon carbide from silicon dioxide and carbon in intermittent operation, by direct electric heating according to the resistance principle, wherein the electric current is supplied by means of electrodes through a resistance core of carbon-containing material, said core being horizontally embedded in the burden consisting of a mixture of granulated coke, quartz sand and additive materials the improvement which comprises: forming said resistance core in a semicircular to U-shape, spacing said electrodes so that the ratio of the length of the resistance core to the distance between said electrodes is at least 1.6, and heating the resistance core to a temperature of 1500° to 2500° C. by passing an electrical current through the electrodes and the resistance core.

11. A process as claimed in claim 10, wherein the resistance core is heated to a temperature within the range of from 1700° to 2500° C.

12. The furnace installation as claimed in claim 1 having up to two end walls wherein at least one electrode is mounted in the floor of said furnace, and wherein the furnace is in the form of a free-standing mound covering the resistance core.

13. The furnace installation as claimed in claim 1 having up to two end walls wherein the two electrodes are mounted in the floor of said furnace, and wherein the furnace charge is in the form of a free-standing mound covering the resistance core.

* * * * *

UNITED STATES PATENT AND TRADEMARK OFFICE
CERTIFICATE OF CORRECTION

PATENT NO. : 4,158,744

DATED : June 19, 1979

INVENTOR(S) : Fritz Petersen, et al

It is certified that error appears in the above—identified patent and that said Letters Patent is hereby corrected as shown below:

Column 2, lines 6-7: "direction, thatis, that is, the form" should read --direction, that is, in the form--.

line 62: "silicon doxide" should be --silicon dioxide--.

Column 3, line 49: "advnatage" should be --advantage--.

Column 4, line 26: "3b" should be --1b--.

line 32: "2b" should be --1b--.

Column 4, Example 1 is set out incorrectly. The phrase "Spacing between two adjacent bottom" at line 47 should not be set out as a title of the example but should be set out as part of the first line of the example at line 50 as follows:

Spacing between two adjacent bottom electrodes (x=y)      80cm

Column 4, lines 49, 54, 62 and 67: Delete the horizontal lines setting off Examples 1 and 2.

UNITED STATES PATENT AND TRADEMARK OFFICE
CERTIFICATE OF CORRECTION

PATENT NO. : 4,158,744
DATED : June 19, 1979
INVENTOR(S) : Fritz Petersen, et al It is certified that error appears in the above—identified patent and that said Letters Patent is hereby corrected as shown below:

Column 4, Example 2 is set out incorrectly. The phrase "Spacing between two adjacent bottom electrodes" at line 60 should not be set out as a title of the example but should be set out as part of the first line of the example at line 63 as follows:

Spacing between two adjacent bottom electrodes (x=y)    2.5m

Column 6, line 29: Cancel "graphite".

Signed and Sealed this

First Day of January 1980

[SEAL]

Attest:

SIDNEY A. DIAMOND

Attesting Officer        Commissioner of Patents and Trademarks